US012734381B2

(12) United States Patent
Wieczerzak

(10) Patent No.: US 12,734,381 B2
(45) Date of Patent: Sep. 15, 2026

(54) FIRE EXTINGUISHER VALVE BODY

(71) Applicant: Carrier Corporation, Palm Beach Gardens, FL (US)

(72) Inventor: Wieslaw Wieczerzak, Czermin (PL)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 423 days.

(21) Appl. No.: 18/160,740

(22) Filed: Jan. 27, 2023

(65) Prior Publication Data

US 2023/0241435 A1 Aug. 3, 2023

(30) Foreign Application Priority Data

Jan. 28, 2022 (EP) .................................... 22154060

(51) Int. Cl.
*A62C 13/70* (2006.01)
*A62C 13/66* (2006.01)
*A62C 13/76* (2006.01)

(52) U.S. Cl.
CPC .............. *A62C 13/70* (2013.01); *A62C 13/66* (2013.01); *A62C 13/76* (2013.01)

(58) Field of Classification Search
CPC .......... A62C 13/70; A62C 13/76; A62C 13/66
See application file for complete search history.

(56) References Cited

U.S. PATENT DOCUMENTS 2,021,241 A 11/1935 Mall
2,580,448 A 1/1952 Daniel et al.
2,620,038 A 12/1952 Somers et al.
2,796,135 A 6/1957 Nurkewicz
2,962,307 A 11/1960 Nebinger
2,981,439 A 4/1961 Huffman
3,092,183 A 6/1963 Guise et al.
3,105,458 A 10/1963 Downham
3,273,610 A 9/1966 Frost
3,314,696 A 4/1967 Ferguson
3,330,527 A 7/1967 Ignatius
(Continued)

FOREIGN PATENT DOCUMENTS

AU 1978033250 A1 8/1979
CN 2683180 Y 3/2005
(Continued)

OTHER PUBLICATIONS

Translation of DE-102010012215, Year 2011.*
(Continued)

*Primary Examiner* — William M McCalister
(74) *Attorney, Agent, or Firm* — CANTOR COLBURN LLP

(57) ABSTRACT

A valve body (5) for a cartridge-operated fire extinguisher includes a first socket (51) configured to have an end of a cartridge (11) filled with propellant installed therein; and a latch (57) movable relative to the first socket (51) between a first position and a second position; in the first position the latch (57) is configured to permit an end of a cartridge (11) filled with propellant to be installed within and removed from the first socket (51); and in the second position the latch (57) is configured to engage with an end of a cartridge (11) installed within the first socket (51) to thereby lock and retain the end of the cartridge (11) within the first socket (51).

15 Claims, 5 Drawing Sheets

(56) References Cited

U.S. PATENT DOCUMENTS

| | | | |
|---|---|---|---|
| 3,450,424 | A | 6/1969 | Calsher |
| 3,675,722 | A | 7/1972 | Balmes, Sr. |
| 3,777,789 | A | 12/1973 | Corlet |
| 3,858,659 | A | 1/1975 | Fukushima |
| 3,998,274 | A | 12/1976 | Liautaud |
| 4,815,541 | A | 3/1989 | Arrington |
| 4,923,350 | A | 5/1990 | Hinksman et al. |
| 5,000,614 | A | 3/1991 | Walker et al. |
| 5,513,882 | A | 5/1996 | Lewis |
| 5,586,792 | A | 12/1996 | Kalahasthy et al. |
| 6,006,956 | A | 12/1999 | Jorgensen et al. |
| 6,076,545 | A | 6/2000 | Cooper |
| 6,371,528 | B1 | 4/2002 | Kimura |
| 6,488,099 | B2 | 12/2002 | McSheffrey et al. |
| 7,150,478 | B2 | 12/2006 | Poirer et al. |
| 7,168,451 | B1 | 1/2007 | Dundas |
| 7,201,403 | B2 | 4/2007 | Takayanagi et al. |
| 7,364,207 | B2 | 4/2008 | McGee et al. |
| 7,387,140 | B2 | 6/2008 | Brunn |
| 7,387,318 | B2 | 6/2008 | Yoshida |
| 7,530,605 | B2 | 5/2009 | Rigollet et al. |
| 8,282,139 | B2 | 10/2012 | Kerin et al. |
| 8,973,952 | B2 | 3/2015 | Nishino et al. |
| 9,086,180 | B2 | 7/2015 | Porta |
| 9,995,420 | B1 | 6/2018 | Topacio |
| 10,010,732 | B2 | 7/2018 | Hu et al. |
| 10,105,562 | B2 | 10/2018 | Arnette |
| 10,113,676 | B2 | 10/2018 | Bush et al. |
| 10,844,988 | B2 | 11/2020 | Simon et al. |
| 10,926,119 | B1 | 2/2021 | Rousseau et al. |
| 2005/0067837 | A1 | 3/2005 | Alexander et al. |
| 2006/0131034 | A1 | 6/2006 | Lahouati |
| 2013/0186655 | A1 | 7/2013 | Mauney |
| 2015/0367154 | A1 | 12/2015 | Rousseau et al. |
| 2016/0287920 | A1 | 10/2016 | Arnette |
| 2023/0241434 | A1 | 8/2023 | Wieczerzak |
| 2023/0241436 | A1 | 8/2023 | Wieczerzak |
| 2023/0241437 | A1 | 8/2023 | Wieczerzak |

FOREIGN PATENT DOCUMENTS

| | | | | | |
|---|---|---|---|---|---|
| CN | 105435395 | A | | 3/2016 | |
| CN | 214286393 | U | | 9/2021 | |
| DE | 2450555 | A1 | | 5/1976 | |
| DE | 2620909 | A1 | | 11/1977 | |
| DE | 9409359 | U1 | | 10/1994 | |
| DE | 29719977 | U1 | | 3/1998 | |
| DE | 102010012215 | A1 | * | 2/2011 | ............ A62C 13/66 |
| DE | 102015003753 | A1 | | 10/2015 | |
| EP | 0773044 | A1 | | 5/1997 | |
| EP | 0965364 | A1 | | 12/1999 | |
| EP | 1175248 | A | | 1/2002 | |
| EP | 1393779 | A1 | | 3/2004 | |
| EP | 1368588 | B1 | | 8/2005 | |
| EP | 1695743 | A1 | | 8/2006 | |
| EP | 2002865 | A2 | | 12/2008 | |
| EP | 2159765 | A1 | | 3/2010 | |
| EP | 2277601 | A1 | | 1/2011 | |
| EP | 2335422 | B1 | | 12/2013 | |
| EP | 1812744 | B1 | | 1/2014 | |
| EP | 3659677 | A1 | | 6/2020 | |
| EP | 3660382 | A1 | | 6/2020 | |
| FR | 1039574 | A | | 10/1953 | |
| FR | 2784735 | A1 | | 4/2000 | |
| FR | 2866242 | A1 | | 8/2005 | |
| FR | 2965486 | A1 | | 4/2012 | |
| FR | 2985912 | A1 | | 7/2013 | |
| GB | 691262 | A | | 5/1953 | |
| GB | 854730 | A | | 11/1960 | |
| GB | 1566815 | A | | 5/1980 | |
| GB | 2076284 | A | | 12/1981 | |
| GB | 2084014 | A | | 4/1982 | |
| GB | 2387632 | B | | 10/2003 | |
| JP | 2010099272 | A | | 5/2010 | |
| WO | 2010035150 | A1 | | 4/2010 | |

OTHER PUBLICATIONS

European Search Report for Application No. 22154060.2; Issued Jul. 11, 2022; 7 Pages.

European Search Report for application EP 22154064.4, Jul. 8, 2022, 6 pages.

European Search Report for application EP 22154086.7, dated Jul. 7, 2022, 6 pages.

European Search Report for Application No. 22154079.2; Issued Jul. 4, 2022; 6 Pages.

* cited by examiner

FIRE EXTINGUISHER VALVE BODY

FOREIGN PRIORITY

This application claims priority to European Patent Application No. 22154060.2, filed Jan. 28, 2022, and all the benefits accruing therefrom under 35 U.S.C. § 119, the contents of which in its entirety are herein incorporated by reference.

TECHNICAL FIELD OF INVENTION

The present invention relates to a valve body for a cartridge-operated fire extinguisher. The invention further extends to a cartridge-operated fire extinguisher comprising said valve body, and to methods of assembling and disassembling such a cartridge-operated fire extinguisher.

BACKGROUND OF THE INVENTION

The regular inspection and maintenance of fire extinguishers is important to ensure that fire extinguishers remain operational and safe to use.

There are different types of fire extinguishers such as stored pressure (also termed constant pressure) fire extinguishers (e.g. DE 29719977 U1) and cartridge-operated fire extinguishers (e.g. EP 0965364 A1 and FR 2985912 A1).

Cartridge-operated fire extinguishers typically have a configuration in which a fire suppressant (e.g. water or dry powder) is stored in an unpressurised cylinder and a propellant is stored under pressure in a separate sealed cartridge within the cylinder. The top of the cylinder is conventionally sealed with a valve body that also holds the cartridge within the cylinder. Activation of a cartridge-operated fire extinguisher first requires piercing of the pressurised cartridge. Piercing of the pressurised cartridge releases the propellant into the unpressurised cylinder through the valve body and forces the fire suppressant out of the cylinder through the valve body and into a hose. The hose can then be aimed by an operative at a fire to be extinguished. A dip tube may also be held by the valve body within the cylinder. The dip tube can be connected to the hose to provide a passage for suppressant and propellant to the hose. In powder based extinguishers, a blow pipe may also be held by the valve body within the fire extinguisher. The blow pipe serves to agitate and mix the powder suppressant at the bottom of the cylinder prior to expulsion from the extinguisher.

Cartridge-operated fire extinguishers are often used in industrial environments such as in construction and heavy equipment industries due to their heavy duty, robust design.

The valve body of a cartridge-operated fire extinguisher is designed such that it is reversibly attachable to the cylinder of the fire extinguisher, usually via suitable threading provided on both the valve body and the cylinder of the fire extinguisher. This permits servicing of the components of the cartridge operated fire extinguisher that are held internal to the cylinder of the fire extinguisher during normal use.

In a similar fashion and for a similar purpose, the cartridge is reversibly attached to a socket of the valve body typically via suitable threading provided in the socket and at the end of the cartridge (see, e.g., EP 0965364 A1 and FR 2985912 A1). In that way, the cartridge can be detached from the valve body and inspected, serviced and/or replaced as required, before the (new) cartridge is reattached to the valve body for reassembly of the fire extinguisher. A dip tube, where present, may also be reversibly attached to another socket of the valve body in a corresponding fashion and for corresponding reasons.

There is a general desire to improve on the inspection and maintenance process of cartridge-operated fire extinguishers.

SUMMARY OF THE INVENTION

In accordance with a first aspect of the invention, there is provided a valve body for a cartridge-operated fire extinguisher, the valve body comprising: a first socket configured to have an end of a cartridge installed therein; and a latch movable relative to the first socket between a first position and a second position; wherein in the first position the latch is configured to permit an end of a cartridge to be installed within and removed from the first socket, and wherein in the second position the latch is configured to engage with a cartridge installed within the first socket to thereby lock and retain the cartridge within the first socket.

The valve body of the first aspect makes use of a movable latch (i.e. a moveable or adjustable catch) for reversibly securing the cartridge thereto. In use, as the latch moves into the second position it engages with the cartridge and thereby locks the cartridge to remain installed within the socket. This is in contrast to conventional valve bodies as discussed above where typically a threaded fastening between the valve body and the cartridge is provided. The use of the movable latch as in the first aspect is advantageous over threaded type connections since an operative can readily visually inspect whether the cartridge has been properly installed into the valve body by observing whether the latch is in the second position (i.e. seated correctly). A visual inspection of a threaded connection is, as will be appreciated by a person skilled in the art, far more challenging/cumbersome, and thus issues with the connection (e.g. cross-threading) can be missed during inspection of proper installation, which in turn can result in non-proper functioning of the fire extinguisher.

The use of the moveable latch also provides a simpler, faster and more readily usable means for installing the cartridge when compared with conventional threaded connections. For instance, no specialist tools are required to fit the cartridge to the valve body; the latch may be readily hand manipulated by an operative e.g. a service technician. There is also no risk of over or under-tightening the cartridge to the valve body of the first aspect (given the absence of a threaded connection) and thus equally there is no need to verify the torque used to attach the cartridge. There is also no risk of cross-threading when attaching a cartridge to the valve body of the first aspect; again an issue that commonly affects conventional valve bodies having threaded connections. Equally, there is no risk of loosening/loss of tightness between the cartridge and the valve body of the first aspect; again an issue that afflicts conventional threaded connection.

The cartridge may be filled with propellant. Alternatively, the cartridge may not be filled with propellant (i.e. the cartridge may be 'empty'), for example after the cartridge has been opened and the propellant has been expelled therefrom.

The first socket is configured to support the cartridge within a fire extinguisher when in use and, once the cartridge has been opened/pierced to permit propellant within the cartridge to exit the cartridge and to be introduced into the cylinder of the fire extinguisher before it is expelled therefrom.

The moveable (i.e. adjustable) latch may be a slidable latch. That is, the latch may be configured to slide from the first position to the second position and vice versa. This may be a linear movement, i.e. the latch may be configured to slide linearly from the first to the second position. The latch may slide in a slot, track or tracks provided on/in the valve body.

Alternative configurations of movement of the latch are also envisaged. For instance, the latch may be pivotable about a pivot between the first and second positions.

The latch may be configured to engage with an end of a cartridge installed within the first socket when the latch is in the second position. Additionally, or alternatively, the latch may be configured to engage with another portion of the cartridge installed within the first socket when the latch is in the second position.

The latch may be permitted to move only between the first and second positions. That is, all other movement of the latch may be prevented other than movement between the first and second positions (and vice versa). Prevention of movement of the latch in all directions other than between the first and second positions may result from engagement of the latch with features of the valve body, e.g. the track, slot(s) (more on these features below), etc.

As alluded to above, the latch may be manually operated (i.e. by hand) by an operative between the first and second positions. Alternatively, the latch may be operated by a suitable tool.

The latch may be configured to engage with a collar (i.e. a flange or lip) provided at an end of a cartridge installed within the first socket when in the second position. Optionally, the latch may be configured to engage between two collars (i.e. two flanges or two lips) provided at an end of a cartridge installed within the first socket when in the second position. The two collars may define a recess therebetween and the latch may be configured to be received within the recess when in the second position so as to lock the cartridge to the valve body. This engagement with the recess may prevent movement of the cartridge in to and out of the valve body e.g. in the axial direction of the cartridge.

The first socket may comprise a wall configured to surround (either wholly or partly) an end of a cartridge once installed therein. The wall may comprise a slot which the latch is configured to move through (at least partly) as it moves between the first position and the second position.

The first socket (e.g. comprising the wall) may be dimensioned so as to provide a close-fit with the end of the cartridge once installed therein. That is, the first socket (e.g. comprising the wall) may be sized for conformity with the dimensions of an end of the cartridge. For example, where an end of a cartridge has a circular cross-section, the wall may be annular and have a diameter only marginally larger than the diameter of the end of the cartridge such that a close-fit is provided once the end of the cartridge is installed therein. This conformity between the sizing of the first socket and an end of a cartridge is advantageous since it provides a clear and simple visual indication that the correct component (i.e. the cartridge) is being installed into the first socket and incorrect assembly of a resultant fire extinguisher can thus be avoided. A 'mistake-proofing' is thus provided by this optional feature of the invention.

The valve body may comprise fastening means configured to reversibly fasten the latch in the second position.

The fastening means may comprise a screw or bolt. The screw or bolt may have a head provided, for example, on a first side of the latch and a shank that, for example, extends through the latch (e.g. through an opening in the latch) to a second side of the latch. In this exemplary but optional arrangement, the latch may be considered as a washer given its relationship with the screw or bolt.

The fastening means (e.g. the screw or bolt) may be of the same type as the fastening means that would be used to fasten the valve body to the cylinder of the fire extinguisher once assembled. In that way, an operative may use the same means, e.g. the same tool (screwdriver, hex key, etc.) to both attach/detach the valve body to the cylinder of the fire extinguisher and to fasten/unfasten the latch into/from the second position.

The threading on the shank may be configured to engage with a counterpart threading in a portion of the valve body. Engagement between the threading on the shank and the counterpart threading may permit fastening of the latch in the second position.

Relative movement of the threading on the shank and the threading on the portion of the valve body situated may permit movement of the latch between the first and the second positions. To say this another way, screwing and unscrewing of the bolt or screw into and out of the portion of the valve body may permit movement of the latch between the first and the second positions.

The valve body may comprise biasing means configured to bias the latch toward the first position (i.e. away from the second position). The biasing means may be in the form a spring, optionally a coiled spring, e.g. a coiled compression spring. The coiled compression spring may be provided on the shank of the bolt or screw and may abut the latch and a fixed portion of the valve body.

The optional combination of the biasing means and the fastening means provide a synergy in that they require the latch to be actively placed and fastened in the second position; the latch cannot be passively/accidentally placed in the second position where the fastening means and biasing means are provided in combination. This is because the biasing means will urge the latch toward the first position and away from the second position.

The end of the cartridge may be integral to the rest of the cartridge (i.e. is unitary with the cartridge). Alternatively, the end of the cartridge (i.e. the portion of the cartridge that is installable within the first socket) may be a component separate from but attached to the remainder of the cartridge. For instance, first socket may be configured to have an adapter attached at the end of an industry-standard gas cartridge installed therein. The adapter may comprise a threaded interior bore which permits its attachment to a conventional type gas cartridge, e.g. of the type used in the prior art cartridge operated fire extinguishers of the type discussed above. This is one way in which conventional gas cartridges can be adapted for use with the valve body of the first aspect of the invention. The adapter may comprise the collar(s) and the recess as discussed above.

The valve body may comprise a second socket configured to have an end of a dip tube installed therein. In the first position the latch may be configured to permit an end of a dip tube to be installed within and removed from the second socket. In the second position, the latch may be configured to engage with a dip tube (e.g. an end of a dip tube) installed within the second socket to thereby lock and retain the dip tube within the second socket. As such, the latch may be configured to simultaneously lock a dip tube and a cartridge to the valve body and may simultaneously permit installation/removal of a dip tube and a cartridge from the valve body. This arrangement means that only a single component (i.e. the latch) is needed for installation and removal of the cartridge and dip tube which enables faster more efficient installation and removal of the dip tube and cartridge as compared to prior art scenarios where each of these components are attached to the valve body by individual threaded connections. The arrangement also ensures that all components are installed correctly in the valve body or not at all, since the latch will not move to the second position unless e.g. the cartridge and dip tube are correctly located to allow that.

The second socket may be configured to support the dip tube within a fire extinguisher when the valve body is in use and may be configured to permit propellant and suppressant that has been introduced into the cylinder to be expelled from the fire extinguisher.

The latch may be configured to engage with a collar (i.e. a flange or lip) provided at an end of a dip tube installed within the second socket when in the second position. Optionally, the latch may be configured to engage between two collars (i.e. two flanges or two lips) provided at an end of a dip tube installed within the second socket when in the second position. The two collars may define a recess therebetween and the latch may be configured to be received within the recess when in the second position.

The second socket may comprise a wall configured to surround (either wholly or partly) an end of a dip tube installed therein. The wall of the second socket may comprise a slot through which the latch is configured to move through (at least partly) as it moves between the first position and second position.

The second socket (e.g. the wall) may be dimensioned so as to provide a close-fit with the end of the dip tube once installed therein. That is, the second socket (e.g. the wall) may be sized for conformity with the dimensions of an end of the dip tube. For example, where an end of a dip tube has a circular cross-section, the wall may be annular and have a diameter only marginally larger than the diameter of the end of the dip tube such that a close-fit is provided once the end of the dip tube is installed therein. This conformity between the sizing of the second socket and an end of a dip tube is advantageous since it provides a clear and simple visual indication that the correct component (i.e. the dip tube) is being installed into the second socket and incorrect assembly of a resultant fire extinguisher can thus be avoided, e.g. through mistaken insertion of the cartridge into the second socket (which, as will be appreciated by the skilled, would typically have different dimensions to those of the dip tube). A 'mistake-proofing' is thus provided by this optional feature of the invention.

The valve body may comprise a third socket. The third socket may be configured to have an end of a blow pipe installed therein, e.g. in scenarios where the valve body is configured to be used with a powder based suppressant.

Alternatively, the third socket may be configured to have a shutter valve installed therein, e.g. in scenarios where the valve body is configured to be used with a water based suppressant.

The third socket may be dimensioned so as to provide a close-fit with the end of the blow pipe/shutter valve once installed therein. That is, the third socket (may be sized for conformity with the dimensions of an end of a blow pipe/a shutter valve). This conformity between the sizing of the third socket and an end of a blow pipe/a shutter valve is advantageous since it provides a clear and simple visual indication that the correct component is being installed into the third socket and incorrect assembly of a resultant fire extinguisher can thus be avoided, e.g. through mistaken insertion of the cartridge/blow pipe into the third socket. A 'mistake-proofing' is thus provided by this optional feature of the invention.

The valve body may be arranged to provide a visual indication when the latch is in the second position. This visual indication may comprise abutment of the latch against a prominence of the valve body and/or alignment of the latch with a marker on the valve body. As such, the valve body may comprise a prominence configured to abut the latch when in the second position and/or a marker configured to align with the latch when in the second position. Such a visual indication provides a simple and quick means for an operative to check that the cartridge and, optionally, the dip tube have been installed and locked to the valve body correctly. Absence of this visual indication would indicate improper installation of the cartridge and/or dip tube since the latch would not be in the second position and thus would not be properly retaining the cartridge and/or dip tube.

The valve body may comprise a cartridge piercer, wherein the cartridge piercer is configured to be operated to pierce a cartridge that has been installed in the first socket, which can thereby release any propellant container therein.

The optional blow pipe may be similarly secured to the valve body within its respective socket by movement of the latch to its second position.

In accordance with a second aspect there is provided a cartridge-operated fire extinguisher comprising: a cylinder with an opening at an end of the cylinder; a valve body in accordance with the first aspect fixed to the cylinder to seal the opening; and a cartridge housed within the cylinder, wherein an end of the cartridge is installed within the first socket, and wherein the latch is in the second position such that the cartridge is locked and retained within the first socket.

The valve body of the second aspect may comprise any optional features of the valve body of the first aspect.

The cartridge-operated fire extinguisher of the second aspect may comprise a dip tube, wherein an end of the dip tube is installed within the second socket of the valve body such that, by virtue of the latch being in the second position, the dip tube is locked and securely retained within the second socket.

The cartridge-operated fire extinguisher of the second aspect may comprise an end of a blow pipe or a shutter valve installed in the third socket.

The cartridge-operated fire extinguisher of the second aspect may comprise a hose connector and/or a hose. The cylinder may house fire suppressant, optionally at or close to ambient pressure e.g. atmospheric pressure. The cartridge may contain a propellant stored under pressure (i.e. at an elevated pressure above ambient conditions). The hose connector may be mounted on the valve body. The hose connector may be used to couple the hose to the valve body.

The fire extinguisher may be arranged so that when the fire extinguisher is operated the cartridge is pierced by the cartridge piercer. After the cartridge is pierced by the cartridge piercer, propellant contained therein may be released from the cartridge such that the fire suppressant stored in the cylinder is expelled from the cylinder. Specifically, once the cartridge has been pierced, the propellant may flow from the cartridge though the valve body into the cylinder optionally via the blow pipe or shutter valve. This may force the fire suppressant (e.g. powder or water) out of the cylinder, optionally through the dip tube, though the valve body, and optionally through the hose, from where it can be directed at a fire for expulsion. Thus, the fire suppressant may be expelled via the valve body, the hose connector, and the hose.

The fire suppressant may comprise one or more of: dry powder, water, foam, any other suitable fire suppressant.

The propellant may comprise carbon dioxide, nitrogen and/or any other suitable propellant.

In a third aspect, the invention provides a method of assembling a cartridge-operated fire extinguisher comprising: installing an end of a cartridge into a first socket of a valve body in accordance with the first aspect of the invention whilst the latch is in the first position; moving the latch into the second position such that the cartridge is locked and retained within the first socket; and fixing the valve body having the cartridge locked thereto to an end of a cylinder in order to seal an opening in the end of the cylinder, wherein the cartridge is housed within the cylinder when the valve body is fixed to the cylinder.

The valve body of the third aspect of the invention may comprise any optional features of the valve body of the first aspect.

The method of the third aspect may result in the cartridge-operated fire extinguisher of the second aspect. The third aspect of the invention may result in any optional form of the second aspect of the invention.

The method of the third aspect may comprise simultaneously securing a plurality of components in the valve body by moving the latch to the second position e.g. simultaneously securing the cartridge and a dip tube.

In a fourth aspect, the invention provides a method of disassembling a cartridge-operated fire extinguisher comprising: detaching a valve body in accordance with the first aspect from an end of a cylinder of the fire extinguisher, wherein the valve body has a cartridge locked thereto; moving the latch of the valve body from the second position and into the first position such that the cartridge is no longer locked within the first socket; and removing the end of the cartridge from the first socket.

The valve body of the fourth aspect may comprise any optional features of the valve body of the first aspect.

The method of the fourth aspect may be a method of disassembling the cartridge-operated fire extinguisher of the second aspect, optionally inclusive of any optional features thereof.

The method of the third and/or fourth aspects may be comprised as part of a method of servicing, repairing, inspecting and/or maintaining the cartridge-operated fire extinguisher. The method of servicing, repairing, inspecting and/or maintaining cartridge-operated fire extinguishers may comprise the further step of replacing the cartridge or installing a new cartridge.

In a fifth aspect, there is provided an assembly comprising: a cylinder of a cartridge operated fire extinguisher with an opening provided at an end of the cylinder; a valve body in accordance with the first aspect configured to seal the opening; and a cartridge, wherein an end of the cartridge is configured to be installed within the first socket and the cartridge is configured to be locked and retained in the first socket by the latch when in its second position.

The components of the assembly of the fifth aspect may be in accordance with the corresponding components discussed in relation to any of the above aspects.

In a sixth aspect, there is provided an adapter, the adapter comprising a threaded interior bore that is configured to permit attachment of the adapter to a counterpart threading provided at the top of a gas cartridge, wherein the adapter is configured to be received within a first socket of a valve body in accordance with the first aspect of the invention and to engage with the latch of the valve body whilst it is in its second position in order to lock the adapter to the valve body.

The adapter may be in accordance with the adapter as set out above in respect of the first aspect.

In another aspect of the invention, there is provided a valve body for a cartridge-operated fire extinguisher comprising an actuable mechanism that is operable to secure a cartridge to/within the valve body. The actuable mechanism may be a latch. The valve body may comprise any of the features recited herein with reference to any aspect of the invention.

In another aspect of the invention, there is provided a method of servicing a fire extinguisher comprising actuating an actuable mechanism to thereby secure a cartridge in a valve body of the fire extinguisher. The actuable mechanism may be a latch. The method may comprise simultaneously securing a plurality of components within the valve body by actuating the actuable mechanism. The method may comprise providing and/or using any of the features recited herein with reference to any aspect of the invention.

BRIEF DESCRIPTION OF THE DRAWINGS

Certain preferred embodiments will now be described, by way of example only, and with reference to the accompanying drawings, in which.

DETAILED DESCRIPTION OF THE INVENTION

Figure 1:
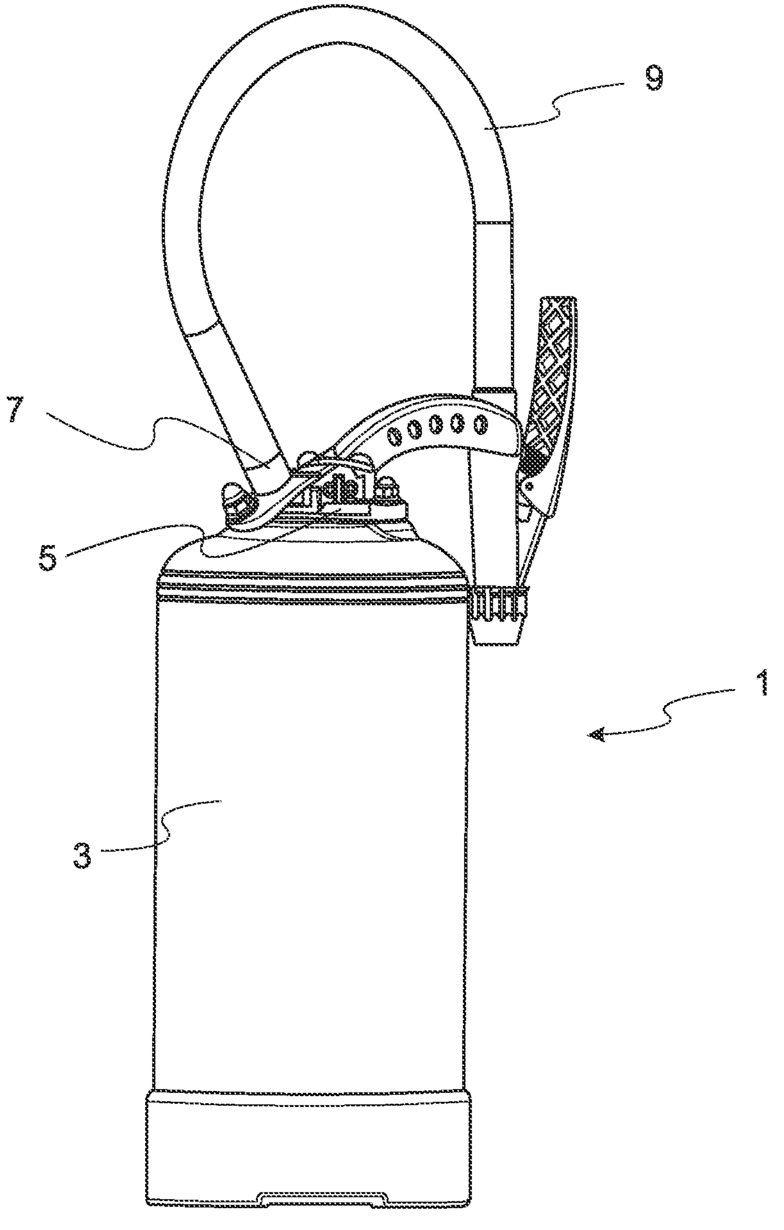
FIG. 1 shows a cartridge operated fire extinguisher.

FIG. 1 shows a cartridge-operated fire extinguisher 1. The fire extinguisher 1 comprises a cylinder 3 that is filled with a powder suppressant, a valve body 5, a hose connector 7 and a hose 9. The valve body 5 is mounted on the top of the cylinder 3 so as to seal an opening at a top of the cylinder 3 and thereby provide an internal space therein that can be pressurised. The hose connector 7 is connected to the valve body 5, and the hose 9 is connected to the hose connector 7. In this way, the hose 9 is fluidly connected to the internal space within the cylinder 3.

Figure 2:
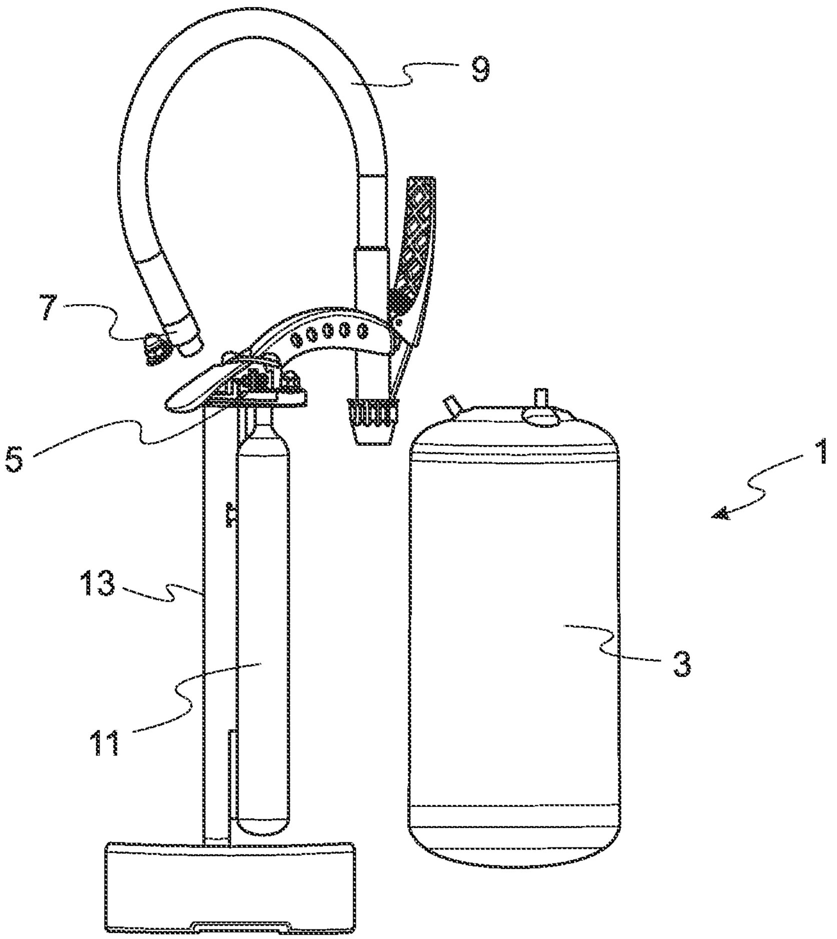
FIG. 2 shows the cartridge operated fire extinguisher of FIG. 1 in a partly disassembled state.

FIG. 2 shows the cartridge operated fire extinguisher 1 in a partly disassembled state where the valve body 5 has been removed from the opening at the top of the cylinder 3 and the hose connector 7 has been disconnected from the valve body 5. Attached to the valve body 5 and held internal to the cylinder 3 of the fire extinguisher 1 in its assembled state (i.e. as in FIG. 1) are a cartridge 11 filled with propellant (e.g. carbon dioxide) under pressure, a dip tube 13 and a blow pipe 15 (which is largely obstructed from view in FIG. 2). An end of each of the cartridge 11, dip tube 13 and blow pipe 15 are installed in respective sockets within the valve body 5, further detail of which can be seen in FIGS. 3 and 4.

Figure 3:
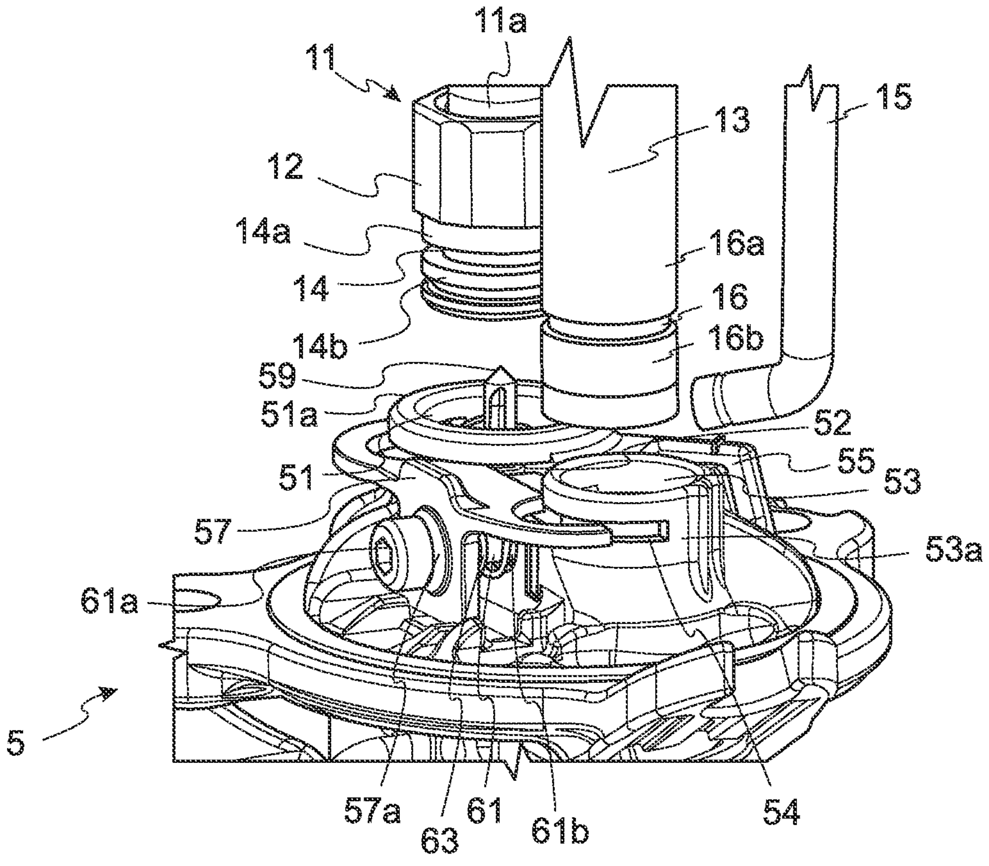
FIG. 3 shows a valve body, a cartridge, a dip tube and a blow pipe of the cartridge operated fire extinguisher in a disassembled state.
Figure 4:
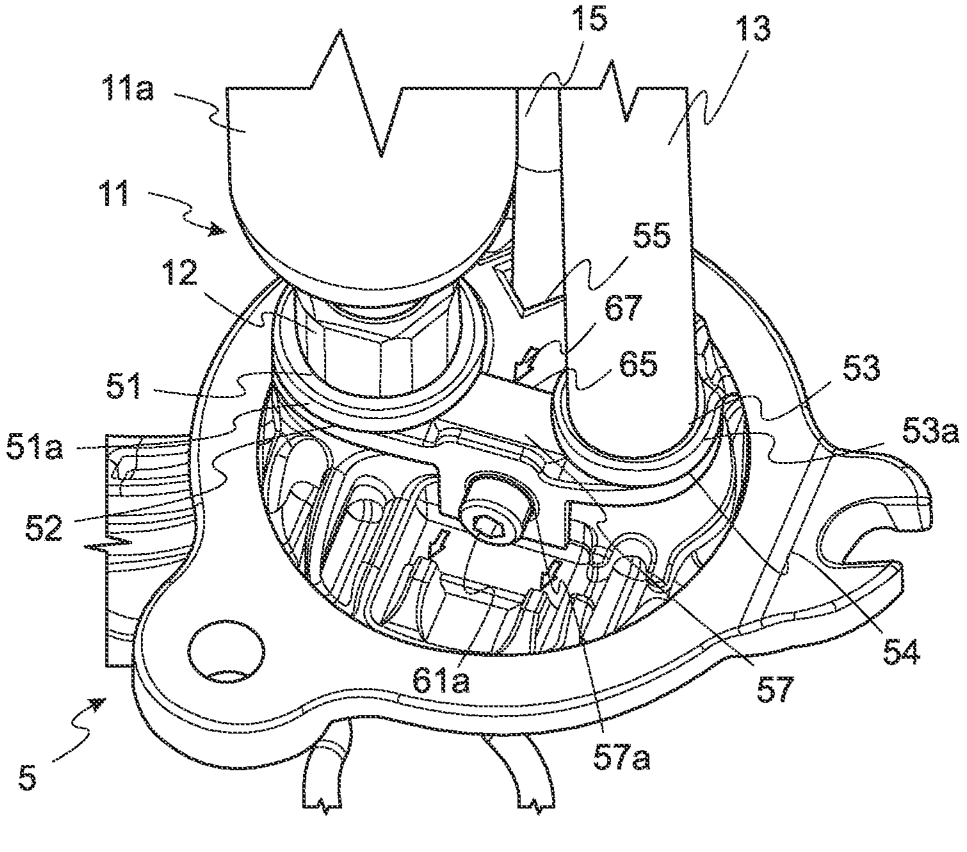
FIG. 4 shows the valve body, the cartridge, the dip tube and the blow pipe in an assembled state.

As shown in FIGS. 3 and 4, the valve body 5 comprises a first socket 51, a second socket 53 and a third socket 55. The first socket 51, which is defined by an annular wall 51*a*, is configured to receive an end of the cartridge 11 (see FIG. 4), specifically an adapter 12 connected at the end of a conventional gas cartridge 11*a* (more on these features below). The first socket 51 is sized so as to closely conform to the dimensions of the end of the cartridge 11 (i.e. the adapter 12) so as to provide a close fit therebetween once the end of the cartridge 11 is installed therein.

The second socket 53 is similarly defined by an annular wall 53*a*, is configured to receive an end of the dip tube 13 (see FIG. 4) and is sized so as to closely conform to the dimensions of the end of the dip tube 13 so as to provide a close fit therebetween once the dip tube 13 is installed therein.

The third socket 55 is shaped so as to have the blow pipe 15 installed therein. Again, the third socket 55 is sized so as to closely conform to the dimensions of the blow pipe 15 to thereby provide a close fit once the blow pipe is installed 15 therein.

The valve body 5 additionally comprises a cartridge piercer 59 positioned within the first socket 51 and operatively moveable relative to and within the first socket 51. When the fire extinguisher 1 is in its assembled form, the cartridge piercer 59 is configured to pierce a seal at the end of the cartridge 11 installed in the first socket 51 upon activation of the fire extinguisher 1 by an operative. When the seal at the end of the cartridge 11 is pierced, the pressurised propellant is released from the cartridge 11 via the adapter 12 and through the valve body 5. The propellant then passes into the blow pipe 15 and then into the internal space of the cylinder 3 where the powder suppressant is stored. The suppressant is then forced up through the dip tube 13 by the pressure of the propellant and to the hose 9 where it is expelled from the fire extinguisher 1.

The cartridge 11 and the dip tube 13 are releasably fixed to the valve body 5 by a slidably actuable latch 57. The latch 57 comprises an aperture 57*a* having a bolt 61 extending therethrough such that a head 61*a* of the bolt 61 is situated on a first side of the latch 57 and a shank 61*b* of the bolt 61 is situated on a second side of the latch 57.

The latch 57 is slidable between a first position (as shown in FIG. 3) and a second position (as shown in FIG. 4). As the latch 57 is moved from the first position to the second position, the latch 57 passes (in part) through slots 52, 54 in the first socket 51 and second socket 53, respectively, such that when in the second position the latch 57 partly protrudes into the interior of the first socket 51 and second socket 53.

The latch 57, once in the second position, may be fastened in the second position by the bolt 61 being screwed into a portion of the valve body 5 on the second side of the latch 57 having a counterpart threading therein. This fastening maintains the latch 57 in the second position as depicted in FIG. 4.

A coiled compression spring 63 is provided along the shank 61*b* of the bolt 61 on the second side of the latch 57 and is configured to abut against the latch 57 and a portion of the valve body 5 so as to bias the latch 57 toward the first position (as in FIG. 3) and away from the second position (as in FIG. 4).

The installation of the cartridge 11 and the dip tube 13 into the valve body comprises installing the adapter 12 attached at the end of the gas cartridge 11*a* into the first socket 51 and installing the end of the dip tube 13 into the second socket 53 whilst the latch 57 is in the first position (i.e. as in FIG. 3) as urged by the bias of the spring 63. Once installed, the latch 57 is moved by an operative manually to the second position.

When in the second position, the latch 57 penetrates through the slots 52, 54 and into an interior of the sockets 51, 53 as defined by the annular walls 51*a*, 53*a*. In this second position, once the cartridge 11 and dip tube 13 have been installed in the first socket 51 and the second socket 53, respectively, the latch 57 engages with the adapter 12 forming the end of the cartridge 11 and the end of dip tube 13. Specifically, the latch 57 is received within recesses 14 and 16 defined on the cartridge 11 and the dip tube 13, respectively, by collars 14*a*, 14*b* and collars 16*a*, 16*b*. Receipt of the latch 57 within the recesses 14, 16 locks the cartridge 11 and dip tube 13 in their installed position within the first socket 51 and the second socket 53 in view of the abutment of the collars 14*a*, 14*b* and collars 16*a*, 16*b* with the latch 57.

Once the latch 57 is in the second position such that it has locked the cartridge 11 and the dip tube 13 to the valve body 5, the bolt 61 can be screwed into the counterpart threaded portion of the valve body 5 in order fasten the latch 57 in the second position. The bolt 61 may comprise a standard shaped slot so that an allen key, hex key, screwdriver or the like may be used to adjust it.

To uninstall the cartridge 11 and the dip tube 13 from the valve body 5, the above process is reversed. That is, the bolt 61 is unscrewed to unfasten the latch 57 from the second position. The bias of the compression spring 63 then forces the latch 57 into the first position and away from the second position. In the first position there is no longer engagement between the latch 57 and the recesses 14, 16 on the cartridge 11 and the dip tube 13, respectively, and thus the retention of the cartridge 11 and the dip tube within the first socket 51 and the second socket 53 is removed. The cartridge 11 and the dip tube 13 may then be removed manually from the first socket 51 and the second socket 53.

To ensure proper installation and retention of the cartridge 11 and the dip tube 13 to the valve body, a prominence 65 and marker 67 are provided on the valve body 5. When in the second position, the prominence 65 is configured to abut a leading edge of the latch 57 whilst the marker 67 is configured to highlight this abutment (see FIG. 4). If either the cartridge 11 or dip tube 13 are not installed properly then the latch 57 will be prevented from reaching the second position since the recesses 14, 16 will not be aligned with the latch 57 to permit the latch 57 to reach the second position. It can be readily identified when the latch 57 is not in the second position since there would not be an abutment adjacent the marker 67 between prominence 65 and the leading edge of the latch 57. An operative can therefore use the visual indication provided by the prominence 65 and marker 67 to ensure proper installation and retention of the cartridge 11 and dip tube 13 to the valve body 5.

Figure 5:
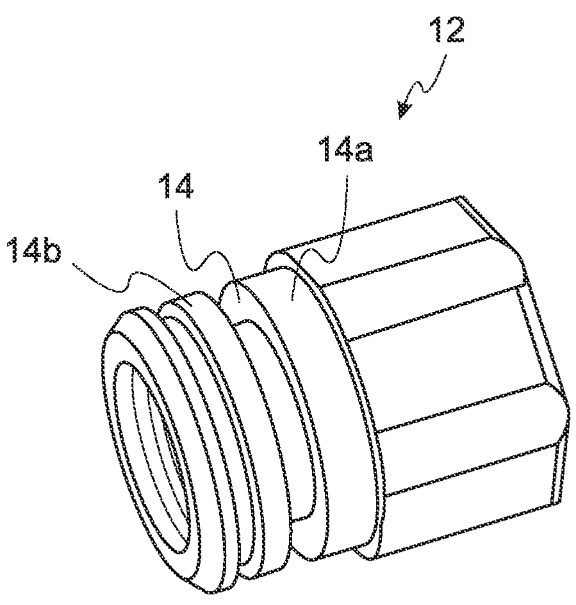
FIG. 5 shows an adapter for a gas cartridge.

As mentioned above, the cartridge 11 of the depicted embodiment comprises an adapter 12 at its end, an enlarged view of which can be seen in FIG. 5. It is the adapter 12 at the end of the conventional gas cartridge 11*a* that comprises the recess 14 defined by the collars 14*a*, 14*b*. The adapter 12 has a threaded interior bore (not shown) such that it can be fitted at the end of the conventional cartridge 11*a* (e.g. the type used in connection with the prior art cartridge operated fire extinguishers discussed above) having a counterpart threading provided at its end. In that way, a conventional cartridge 11*a* can be converted for use with the valve body 5 of the current invention.

Figure 6:
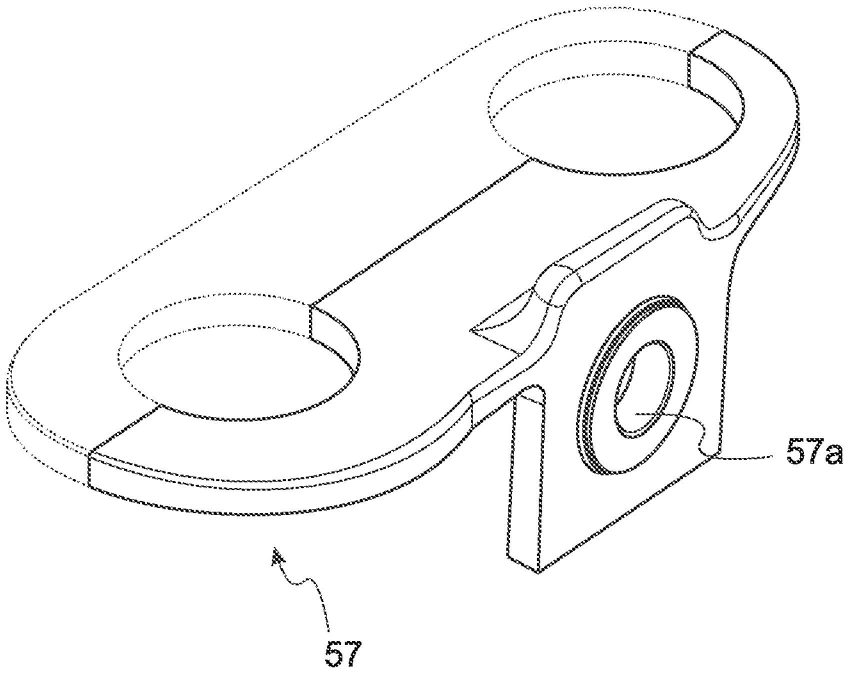
FIG. 6 shows a latch of the valve body.

FIG. 6 shows an enlarged view of the slidable latch 57 of the above described embodiment of the valve body.

What is claimed is:

1. A valve body for a cartridge-operated fire extinguisher, the valve body comprising:

a first socket configured to have an end of a cartridge installed therein;

a latch movable relative to the first socket between a first position and a second position; and fastening means configured to reversibly fasten the latch in the second position;

wherein in the first position the latch is configured to permit an end of a cartridge to be installed within and removed from the first socket; and wherein in the second position the latch is configured to directly engage with a cartridge installed within the first socket to thereby lock and retain the cartridge within the first socket; and wherein the fastening means comprises a screw or bolt having a head and a shank, wherein a threading on the shank is configured to engage with a counterpart threading in a portion of the valve body, and wherein engagement between the threading on the shank and the counterpart threading permits fastening of the latch in the second position.

2. A valve body as claimed in claim 1, wherein the latch is configured to engage with a collar provided at an end of a cartridge installed within the first socket.

3. A valve body as claimed in claim 1, wherein the first socket comprises a wall configured to surround an end of a cartridge once installed therein, and wherein the latch is configured to move through a slot in the wall as it moves between the first position and the second position.

4. A valve body as claimed in claim 1, comprising biasing means configured to bias the latch toward the first position.

5. A valve body as claimed in claim 1, wherein the valve body comprises a second socket configured to have an end of a dip tube installed therein.

6. A valve body as claimed in claim 5, wherein in the first position the latch is configured to permit an end of a dip tube to be installed within and removed from the second socket, and wherein in the second position the latch is configured to engage with a dip tube installed in the second socket to thereby lock and retain the dip tube within the second socket.

7. A valve body as claimed in claim 5, wherein the second socket comprises a wall configured to surround an end of a dip tube installed therein, and wherein the latch is configured to move through a slot in the second socket wall as it moves between the first position and second position.

8. A valve body as claimed in claim 1, comprising a third socket configured to have an end of a blow pipe or a shutter valve installed therein.

9. A valve body as claimed in claim 1, wherein the valve body is arranged to provide a visual indication when the latch is in the second position.

10. A valve body as claimed in claim 9, wherein the valve body comprises a marker that is arranged to provide the visual indication and/or wherein the visual indication comprises abutment of the latch against a prominence of the valve body.

11. A cartridge-operated fire extinguisher comprising:

a cylinder with an opening at an end of the cylinder;

a valve body as claimed in claim 1 fixed to the cylinder to seal the opening; and a cartridge housed within the cylinder, wherein an end of the cartridge is installed within the first socket, and wherein the latch is in the second position such that the cartridge is locked and retained within the first socket.

12. A method of assembling a cartridge-operated fire extinguisher comprising:

installing an end of a cartridge into a first socket of a valve body in accordance with claim 1 whilst the latch is in the first position;

moving the latch into the second position such that the cartridge is locked and retained within the first socket; and fixing the valve body having the cartridge locked thereto to an end of a cylinder in order to seal an opening in the end of the cylinder, wherein the cartridge is housed within the cylinder when the valve body is fixed to the cylinder.

13. A method of disassembling a cartridge-operated fire extinguisher comprising:

detaching a valve body in accordance with claim 1 from an end of a cylinder of the fire extinguisher, wherein the valve body has a cartridge locked thereto;

moving the latch of the valve body from the second position and into the first position such that the cartridge is no longer locked within the first socket; and removing the end of the cartridge from the first socket.

14. A valve body for a cartridge-operated fire extinguisher, the valve body comprising:

a first socket configured to have an end of a cartridge installed therein; and a latch movable relative to the first socket between a first position and a second position;

wherein in the first position the latch is configured to permit an end of a cartridge to be installed within and removed from the first socket;

wherein in the second position the latch is configured to directly engage with a cartridge installed within the first socket to thereby lock and retain the cartridge within the first socket;

wherein the valve body comprises a second socket configured to have an end of a dip tube installed therein; and wherein in the first position the latch is configured to permit an end of a dip tube to be installed within and removed from the second socket, and wherein in the second position the latch is configured to engage with a dip tube installed in the second socket to thereby lock and retain the dip tube within the second socket.

15. A valve body for a cartridge-operated fire extinguisher, the valve body comprising:

a first socket configured to have an end of a cartridge installed therein; and a latch movable relative to the first socket between a first position and a second position;

wherein in the first position the latch is configured to permit an end of a cartridge to be installed within and removed from the first socket;

wherein in the second position the latch is configured to directly engage with a cartridge installed within the first socket to thereby lock and retain the cartridge within the first socket;

wherein the valve body comprises a second socket configured to have an end of a dip tube installed therein; and wherein the second socket comprises a wall configured to surround an end of a dip tube installed therein, and wherein the latch is configured to move through a slot in the second socket wall as it moves between the first position and second position.

* * * * *